United States Patent
Wehmeyer

[15] 3,670,448
[45] June 20, 1972

[54] FISH HOOK LOCATOR-EXTRACTOR

[72] Inventor: Thomas R. Wehmeyer, 639 10th Ave., New York, N.Y. 10036

[22] Filed: Feb. 17, 1971

[21] Appl. No.: 116,062

[52] U.S. Cl. ............................................................43/53.5
[51] Int. Cl. .......................................................A01k 97/00
[58] Field of Search....................................................43/53.5

[56] References Cited

UNITED STATES PATENTS

| | | | |
|---|---|---|---|
| 2,164,907 | 7/1939 | Falkner | 43/53.5 |
| 2,644,268 | 7/1953 | Klinicki | 43/53.5 |
| 3,132,438 | 5/1964 | Ward et al. | 43/53.5 |

*Primary Examiner*—Samuel Koren
*Assistant Examiner*—Daniel J. Leach
*Attorney*—Robert E. Burns and Emmanuel J. Lobato

[57] ABSTRACT

A fish hook locator-extractor for locating and extracting a fish hook that has been swallowed by a fish comprises an elongated shank having a rounded pear-shaped handle at one end. The opposite end portion of the shank is hollow and terminates in a plurality of longitudinally extending, circumferentially spaced rounded projections separated by sharp V-shaped recesses. A longitudinal slot opens into said hollow in alignment with one of said recesses and a groove extends longitudinally along the shank from the slot to and over the end of the handle. A removable cross bar extends through a transverse bore in the handle portion.

10 Claims, 6 Drawing Figures

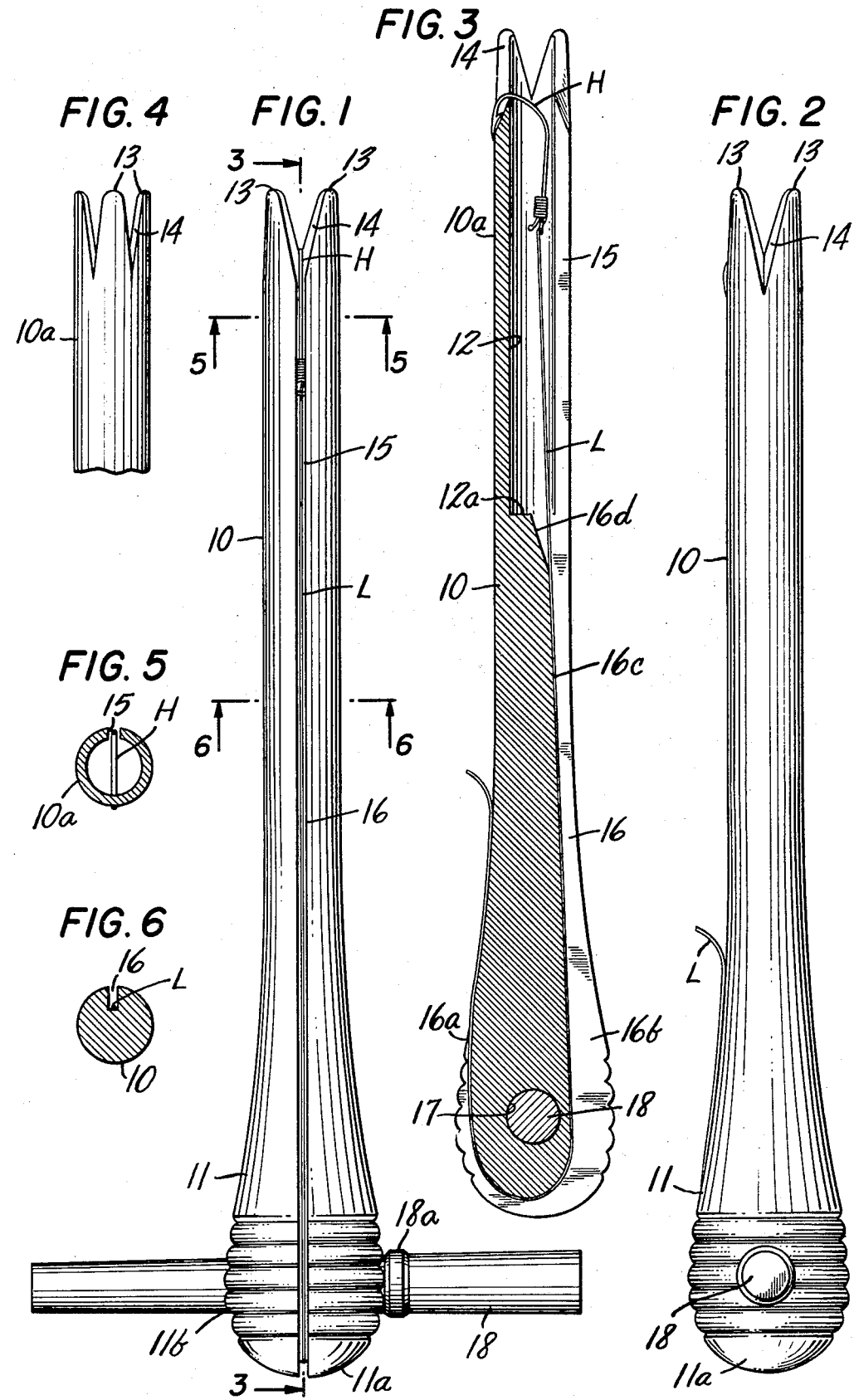

FISH HOOK LOCATOR-EXTRACTOR

The present invention relates to a fish hook locator-extractor for locating and extracting a fish hook that has been swallowed by a fish.

When a fish has been caught on a line, it is necessary to remove the hook. Moreover, if the fish is to be thrown back or is to be kept alive in a holding tank, the hook must be removed carefully to avoid injuring the fish. This is always difficult because the fish is wet, slippery and wiggling and a barbed hook is not easily removed. Moreover, when a fish takes the bait, it frequently swallows both the bait and the hook so that the hook becomes deeply imbedded in the throat, or even in the stomach, of the fish, It is then impossible to see the hook and extremely difficult to locate it. The removal of a deeply embedded hook is quite impossible without a suitable instrument.

A number of "disgorgers" and other devices have been previously proposed for removing fish hooks from fish while the fish are still alive. However, they have been impractical in that they are difficult and even dangerous to use and, moreover, cause serious damage to the fish. They have hence not come into wide use.

It is an object of the present invention to provide a fish hook locator and extractor which is easy and safe to use even by an inexperienced person and is highly effective in locating and removing a fish hook without injury to the fish, even when the hook is lodged deeply in the throat or stomach of the fish. Moreover, the fish hook locator-extractor in accordance with the invention is of simple construction which is inexpensive to manufacture, free of movable parts which might get out of order, highly durable and completely sanitary. It is of a shape and size that can be readily stored in a tackle box or can be suspended by a ring or their simple fixture at convenient places on a boat or dock so that it is always ready for use.

The nature and advantages of the fish hook locator-extractor in accordance with the invention will be more fully understood from the following description in conjunction with the accompanying drawings, in which a preferred embodiment is illustrated by way of non-limiting example. In the drawings:

FIG. 1 is a side view of a fish hook locator-extractor in accordance with the invention;

FIG. 2 is a side view taken at 90° from FIG. 1;

FIG. 3 is a longitudinal section taken on the line 3—3 in FIG. 1;

FIG. 4 is a side view of an end portion taken at an angle of 45° to the view shown in FIG. 1; and FIGS. 5 and 6 are cross-sections taken respectively on the lines 5—5 and 6—6 in FIG. 1.

As illustrated in the drawings, a fish hook locator and extractor comprises an elongated shank portion 10 which is preferably of circular cross-section. At one end of the shank 10 there is an enlarged pear-shaped handle portion 11 having a smooth rounded end 11a. The enlarged handle tapers smoothly into the shank portion 10. The larger portion of the handle is grooved or otherwise patterned so as to provide a non-slip hand-grip portion 11b. As illustrated by way of example in the drawings, the handgrip portion has a plurality of circumferential grooves alternating with rounded ridges. The locator-extractor can thereby be held firmly and securely in the hand even when it is wet.

An end portion 10a of the shank 10 opposite the handle 11 is of tubular cross-section with an internal cylindrical hollow or cavity 12. The length of the hollow portion 10a is preferably about one-fourth to one-half of the overall length of the instrument. The internal diameter of the hollow portion is about two-fifths to three-fifths of the external diameter. For example, if the outside diameter of the shank is approximately five-eights inch, the inside diameter may be approximately three-eights inch. With a locator-extractor of the order of 10 inches long, the length of the hollow portion may, for example, be about 4 inches. The diameter of the largest portion of the handle may be about 1⅜ inches.

At the end of the hollow portion 10a, there are a plurality of longitudinally extending, circumferentially spaced projections 13 separated by sharp V-shaped recesses or notches 14. The ends of the projections 13 are rounded, as clearly seen in FIG. 4, so that when the locator-extractor is inserted into the throat of a fish, as will be described below, it enters smoothly without injuring the fish. The depth of the notches 14 is greater than the outside diameter of the shank 10. In an instrument of the size shown in the drawings, the notches 14 may, for example, be three-fourths inch to 1 inch deep. As seen in FIGS. 1 and 2, the side edges of the notches 14 are beveled outwardly, so that they intersect in a line that is inclined outwardly toward the handle, as seen in FIG. 3. The number of projections 13 and corresponding number of notches or recesses 14 is at least three and preferably not more than five. In the example shown in the drawings, there are four projections.

A longitudinally extending slot 15 provided in the wall of the hollow portion 10a in line with one of the recesses 14 opens into the hollow 12. The slot 15 is just sufficiently wide to admit the shank and eye of a fish hook with an attached line. In line with the slot 15 and forming a continuation thereof, there is a groove 16 which extends longitudinally to and over the end of the handle portion 11, terminating at a point 16a on the opposite side of the handle. The portion 16b of the groove 16 in the handle portion 11 is deeper than the portion 16c in the shank 10 so that a fishline L extending from a hook H, as shown in FIG. 3, will extend in a straight line and will lie in the groove 16 throughout its length. As seen in FIG. 3, the line L extends in the groove over the end of the handle and out of the end portion 16a of the groove. A portion 16d of the groove approaching the hollow 12 is chamfered, as seen in FIG. 3, so that it enters the bottom 12a of the hollow 12 at about the center of the shank portion. The width of the slot 15 and groove 16 in an instrument of the size illustrated in the drawings is of the order of one-sixteenth inch.

A tapered bore 17 extending transversely through the larger portion of the handle 11 receives a tapered cross bar 18 which is removably inserted in the bore, as seen in FIGS. 1, 2 and 3. The diameter and taper of the cross bar correspond to the diameter and taper of the bore so that when the cross bar is inserted it will be held firmly in place by friction and yet be readily removable. An integral radially projecting ring 18a on the cross bar prevents the cross bar from being inserted into the bore of the handle so tightly as to be difficult to remove. The length of the cross bar in an instrument of the size illustrated in the drawings may, for example, be of the order of 4 to 5 inches and its diameter may be of the order of one-half inch with suitable taper. The cross bar is readily removed so that the locator-extractor may be stored more easily in a tackle box. On the other hand, when the cross bar is in place, it provides a convenient means for suspending the locator-extractor by means of a ring, loop of line or other suitable fitting at a convenient location on a boat or fishing wharf.

In use, the hollow end portion of the locator-extractor in accordance with the invention is inserted into the mouth and throat of the fish with the fishline entering through the slot 15 into the hollow 12 so as to guide the instrument to the fish hook. When the instrument engages the fish hook, the hook slips into one or another of the recesses 14, as illustrated in FIG. 3. To facilitate entry of the hook into a recess, the locator-extractor may be turned back and forth slightly as it is inserted into the throat of the fish. When the locator-extractor has engaged the hook, it is pushed in a little harder so as to disengage the hook from the tissues of the fish's throat in which it has been embedded. The point of the hook will thereupon lie in the bottom of one of the V-shaped recesses 14, as seen in FIG. 3. The locator-extractor is then drawn out, bringing the hook with it. To assure that the hook remains properly engaged in one of the recesses at the hollow end of the locator-extractor, the fishline is brought over the end of the handle portion 11 in the groove 16, as seen in FIG. 3, and can be gripped along with the handle so as to be held taut. Moreover, if desired, the line, after passing over the end of the handle portion in the groove 16, may be given one or more turns around the cross bar 18 so as to hold it still more securely. Since the point of the hook lies in one of the recesses 14, the hook can be withdrawn without injury to the fish. It will be seen that the barb of the hook is in effect sheathed in the recess 14.

The locator-extractor in accordance with the invention can be made of any suitable material such as wood or plastic which is hard and durable and impervious to water. Preferably, the material has a specific gravity less than 1 so that the locator-extractor will float if it is accidentally dropped in the water. The one-piece construction and the smooth contour of the locator-extractor not only gives it a neat and pleasing appearance but also makes it easy to keep the instrument clean and sanitary.

While a preferred embodiment of the invention has been illustrated in the drawings and is herein particularly described, it will be understood that the invention is in no way limited to the illustrated example.

What I claim is:

1. A fish hook locator-extractor for locating and extracting a fish hook that has been swallowed by a fish, comprising an elongated shank and a handle portion at one end of said shank, an end portion of said shank at the end opposite said handle portion being hollow with a longitudinal slot opening into said hollow, said opposite end portion terminating in a plurality of longitudinally extending circumferentially spaced projections with sharp V-shaped recesses between said projections, said slot opening into one of said recesses, a fish line attached to a hook that has been swallowed by a fish being received through said slot into said hollow to guide said locator-extractor to said hook, and said hook being received and lodged in one of said recesses whereby it is disengaged from the tissues of said fish by inward movement of said locator-extractor and is thus withdrawn with said locator-extractor from the throat of said fish.

2. A fish hook locator-extractor according to claim 1, in which edges of said recesses are bevelled and meet at the point of said recess in a sharp V that slopes outwardly and toward said handle portion.

3. A fish hook locator-extractor according to claim 2, in which the ends of said projections are rounded.

4. A fish hook locator-extractor according to claim 3, in which there are at least three and not more than four said projections.

5. A fish hook locator-extractor according to claim 3, in which a groove extends longitudinally along said shank from said slot to said handle portion, said groove being of a size to receive a fish line.

6. A fish hook locator-extractor according to claim 5, in which said groove increases progressively in depth as it approaches the bottom of said hollow to provide a chamferred entrance into said hollow.

7. A fish hook locator-extractor according to claim 1, in which said handle portion is larger than said shank and is approximately pear-shaped.

8. A fish hook locator-extractor according to claim 7, in which said handle portion is circumscribed by a plurality of grooves providing a grip surface.

9. A fish hook locator-extractor according to claim 7, in which a groove extends longitudinally along said shank from said slot to and over the end of said handle portion, terminating on the opposite side of said handle portion.

10. A fish hook locator-extractor according to claim 7, in which said handle has a bore extending transversely therethrough and a cross bar is removably received in and extends through said bore.

* * * * *